(12) United States Patent
Och et al.

(10) Patent No.: US 10,254,952 B2
(45) Date of Patent: Apr. 9, 2019

(54) PROGRESS DISPLAY OF HANDWRITING INPUT

(71) Applicant: Google LLC, Mountain View, CA (US)

(72) Inventors: Franz Josef Och, Palo Alto, CA (US); Thomas Deselaers, Zurich (CH); Daniel Martin Keysers, Stallikon (CH); Henry Allan Rowley, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 327 days.

(21) Appl. No.: 13/626,963

(22) Filed: Sep. 26, 2012

(65) Prior Publication Data

US 2014/0085215 A1 Mar. 27, 2014

(51) Int. Cl.
| | | |
|---|---|---|
| G06F 3/0488 | (2013.01) | |
| G06K 9/00 | (2006.01) | |
| G06K 9/03 | (2006.01) | |

(52) U.S. Cl.
CPC ..... *G06F 3/04883* (2013.01); *G06K 9/00402* (2013.01); *G06K 9/00979* (2013.01); *G06K 9/033* (2013.01)

(58) Field of Classification Search
CPC .................................................. G06F 3/04883
USPC ................................................ 345/156–158
See application file for complete search history.

(56) References Cited

U.S. PATENT DOCUMENTS

| | | |
|---|---|---|
| 5,710,832 A | 1/1998 | Berman et al. |
| 7,502,017 B1 | 3/2009 | Ratzlaff et al. |
| 7,567,239 B2 | 7/2009 | Seni |
| 7,734,094 B2 | 6/2010 | Revow |
| 7,756,335 B2 | 7/2010 | Sternby |
| 2002/0009226 A1 | 1/2002 | Nakao et al. |

(Continued)

FOREIGN PATENT DOCUMENTS

| | | |
|---|---|---|
| CN | 102243570 | 11/2011 |
| EP | 1022648 | 7/2000 |

(Continued)

OTHER PUBLICATIONS

PCT International Search Report and Written Opinion dated Jan. 20, 2014 for International Application No. PCT/US2013/061130 (12 pages).

(Continued)

*Primary Examiner* — Joseph R Haley
(74) *Attorney, Agent, or Firm* — Fish & Richardson P.C.

(57) ABSTRACT

A computer-implemented method includes: receiving, at a user device, user input corresponding to handwritten text to be recognized using a recognition engine; and receiving, at the user device, a representation of the handwritten text. The representation includes the handwritten text parsed into individual handwritten characters. The method further includes: displaying, on a display of the user device, the handwritten characters using a first indicator; receiving, at the user device, an identification of a text character recognized as one of the handwritten characters; displaying, on the display, the text character; and adjusting, at the user device, the one of the handwritten characters from being displayed using the first indicator to using a second indicator in response to the received identification. The first and second indicators are different.

22 Claims, 10 Drawing Sheets

(56) References Cited

U.S. PATENT DOCUMENTS

| | | | |
|---|---|---|---|
| 2005/0128181 A1* | 6/2005 | Wang et al. | 345/156 |
| 2005/0152602 A1 | 7/2005 | Chen et al. | |
| 2005/0249419 A1* | 11/2005 | Rieman | 382/229 |
| 2006/0209040 A1* | 9/2006 | Garside et al. | 345/173 |
| 2009/0226091 A1* | 9/2009 | Goldsmith et al. | 382/189 |
| 2010/0067674 A1* | 3/2010 | Lee | G06F 3/03545 |
| | | | 379/100.01 |
| 2011/0279379 A1* | 11/2011 | Morwing | G06F 3/0237 |
| | | | 345/173 |
| 2011/0313757 A1 | 12/2011 | Hoover et al. | |
| 2014/0028585 A1* | 1/2014 | Park | G06F 3/0482 |
| | | | 345/173 |

FOREIGN PATENT DOCUMENTS

| | | | |
|---|---|---|---|
| HU | 2006064295 | * | 12/2005 |
| JP | 2000-227863 | | 8/2000 |
| JP | 2002-15282 | | 1/2002 |
| JP | 2002007962 | | 1/2002 |
| JP | 2005- 202959 | | 7/2005 |
| JP | 2012-042985 | | 3/2012 |
| WO | WO 2006064295 | * | 12/2005 |
| WO | 2006064295 A | | 6/2006 |

OTHER PUBLICATIONS

Office action issued in Chinese Application No. 201380061607.4, dated Dec. 4, 2017, 1 page. (English Summary of Office Action).
Office Action issued in Japanese Application No. 2015-534576, dated Aug. 28, 2017, 3 pages (English Translation Only).
Notice of Allowance issued in Japanese Application No. 2015-534576, dated Mar. 12, 2018, 3 pages (English Translation Only).

* cited by examiner

PROGRESS DISPLAY OF HANDWRITING INPUT

FIELD

The present disclosure relates to user devices and more particularly to recognition of handwritten text that is input to user devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A "user device" generally refers to a computing device having user interface, a display, and a processor. For example, the user device may be a desktop computer. User devices also may include mobile user devices such as mobile phones, tablet computers, and the like. User devices may selectively connect to a network such as the Internet and/or a mobile telephone network. A user may input information, e.g., text, to the user device via a user interface (or "character layout") such as a keyboard.

Due to size constraints, however, many user devices, e.g., mobile user devices, may include a partial QWERTY-based physical keyboard. Additionally or alternatively, user devices may include touch displays, e.g., capacitive sensing displays, which both display information to the user and receive input from the user. For example, these user devices may display a character layout to the user similar to the partial QWERTY-based keyboard.

SUMMARY

In a feature, a first computer-implemented method includes: receiving, at a user device, user input corresponding to handwritten text to be recognized; transmitting, from the user device, a representation of the handwritten text to a server for recognition of the handwritten text; and receiving, at the user device, an indication of handwritten characters from the server. The handwritten characters are determined by the server based on the representation of the handwritten text. The method further includes: displaying the handwritten characters on a display of the user device using a first color; and receiving indications of text characters at different times from the server. The text characters are determined by the server based on the handwritten characters, respectively. The method further includes: displaying the text characters on the display as the indications are received, respectively; and changing the handwritten characters from the first color to a second color on the display in response to receipt of the indications of the text characters, respectively; and removing the handwritten characters from display only after the text characters are all displayed. The first and second colors are different.

In a feature, a second computer-implemented method includes: receiving, at a user device, user input corresponding to handwritten text to be recognized using a recognition engine; and receiving, at the user device, a representation of the handwritten text. The representation includes the handwritten text parsed into individual handwritten characters. The second method further includes: displaying, on a display of the user device, the handwritten characters using a first indicator; receiving, at the user device, an identification of a text character recognized as one of the handwritten characters; displaying, on the display, the text character; and adjusting, at the user device, the one of the handwritten characters from being displayed using the first indicator to using a second indicator in response to the received identification. The first and second indicators are different.

In other features, the first indicator is a first color and the second indicator is a second color.

In still other features, the second method further includes: receiving, at the user device, a second identification of a second text character recognized as a second one of the handwritten characters; and adjusting, at the user device, the second one of the handwritten characters from being displayed using the first indicator to using the second indicator in response to the received second identification.

In further features, the second method further includes: determining, at the user device, a possible stem for the handwritten text based on the text character and the second text character; and displaying, on the display, the possible stem.

In still further features, the second method further includes: receiving, at the user device, user input indicating a selection of the possible stem; determining, at the user device, a possible word for the handwritten text based on the possible stem; and displaying, on the display, the possible word in response to the receipt of the user input indicating the selection of the possible stem.

In other features, the second method further includes displaying, on the display, a progress bar indicative of an amount of the handwritten text that has been recognized.

In still other features, the second method further includes displaying, on the display, a percentage corresponding to the amount.

In further features, the second method further includes removing at least one of the handwritten characters from the display only after text characters recognized for the handwritten characters are all displayed.

In still further features, the display is a touch display and the user input is received via the touch display.

In other features, the second method further includes: receiving, at the user device, a second user input corresponding to additional handwritten text to be recognized using the recognition engine; and changing a size of the displayed handwritten characters in response to the second user input.

In a feature, a user device includes a display, a processor, and a user interface module. The user interface module: receives user input corresponding to handwritten text to be recognized using a recognition engine; and receives a representation of the handwritten text. The representation includes the handwritten text parsed into individual handwritten characters. The user interface module further: displays, on the display, the handwritten characters using a first indicator; receives an identification of a text character recognized as one of the handwritten characters; displays, on the display, the text character; and adjusts, on the display, the one of the handwritten characters from being displayed using the first indicator to using a second indicator in response to the received identification. The first and second indicators are different.

In other features, the first indicator is a first color and the second indicator is a second color.

In still other features, the user interface module further: receives a second identification of a second text character recognized as a second one of the handwritten characters; and adjusts, on the display, the second one of the handwritten characters from being displayed using the first indicator to using the second indicator in response to the received second identification.

In further features, the user interface module further: determines a possible stem for the handwritten text based on the text character and the second text character; and displays, on the display, the possible stem.

In still further features, the user interface module further: receives user input indicating a selection of the possible stem; determines a possible word for the handwritten text based on the possible stem; and displays, on the display, the possible word in response to the receipt of the user input indicating the selection of the possible stem.

In other features, the user interface module further displays, on the display, a progress bar indicative of an amount of the handwritten text that has been recognized.

In still other features, the user interface module further displays, on the display, a percentage corresponding to the amount.

In further features, the user interface module further removes at least one of the handwritten characters from the display only after text characters recognized for the handwritten characters are all displayed.

In still further features, the display is a touch display and the user input is received via the touch display.

In other features, the user interface module further: receives a second user input corresponding to additional handwritten text to be recognized using the recognition engine; and changes a size of the displayed handwritten characters in response to the second user input.

In additional features, a computing device is disclosed. The computing device can include a non-transitory computer-readable storage medium and at least one processor. The non-transitory computer-readable storage medium can include executable computer program code for performing any or all of the computer-implemented methods described above, in particular the handwriting recognition method itself, and the at least one processor can be configured to execute the executable computer program code.

In further features, a non-transitory computer-readable storage medium storing executable computer program instructions is disclosed. The computer program instructions can include instructions for performing any or all of the computer-implemented methods described above.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
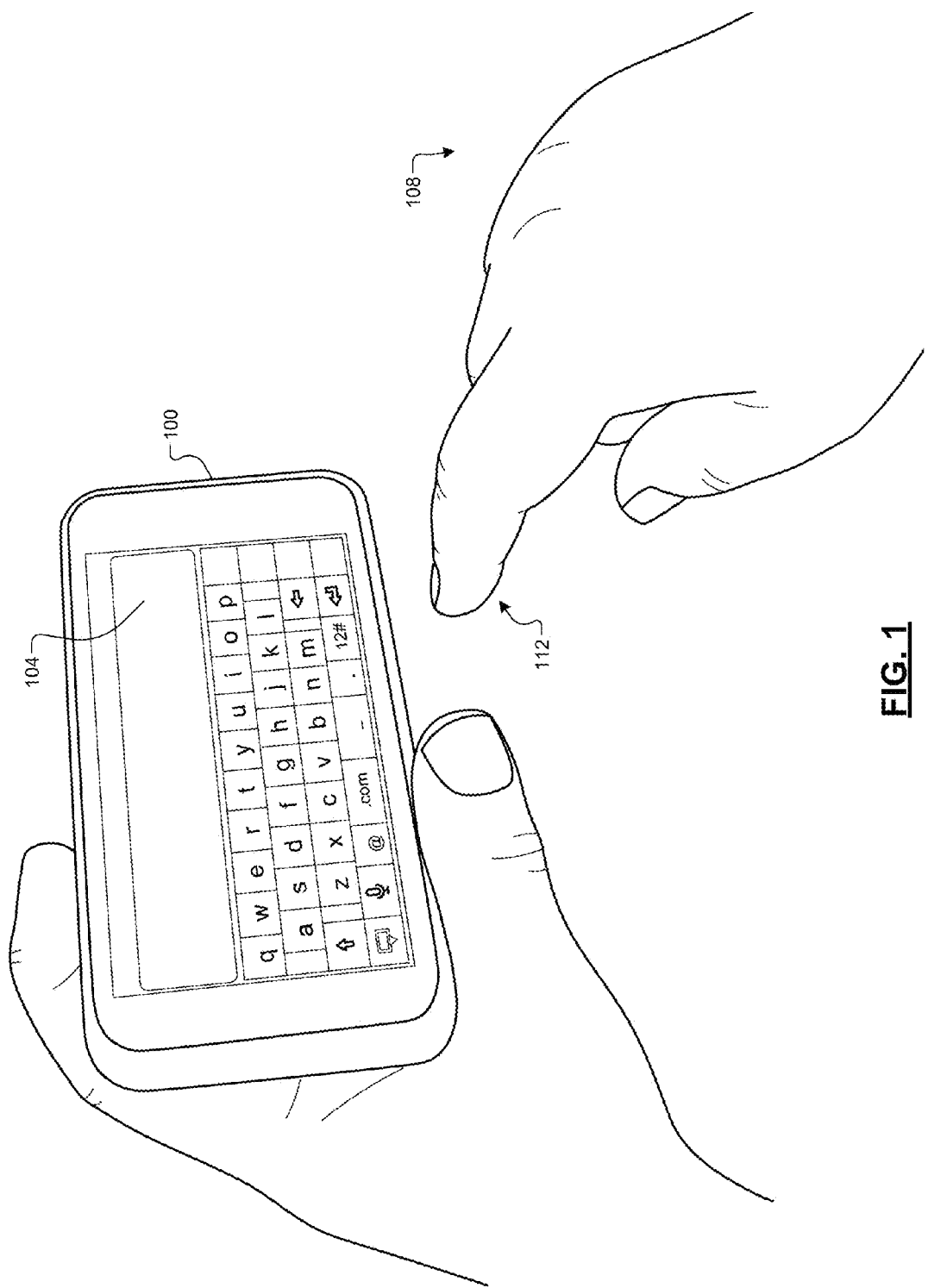
FIG. 1 illustrates an example of a user interacting with an example user device according to some implementations of the present disclosure.

Referring now to FIG. 1, an example illustration of a user interacting with an example user device 100 is presented. The user device 100 may be any computing device, such as a mobile phone (as shown), a tablet computer, a laptop computer, or a desktop computer.

The user device 100 includes a display 104. For example, the display 104 may be a touch display as shown. The user device 100 may additionally or alternatively include a physical character layout, such as a partial QWERTY-based keyboard (not shown).

The touch display 104 may display information and receive input from a user 108. For example only, the user 108 may input information to the user device 100 via the touch display 104 using one or more fingers, such as finger 112. The user 108 may additionally or alternatively input information to the user device 100 via the touch display 104 using a stylus, a mouse, a trackball, or the like.

User devices are widely available and thus may be used in many different countries throughout the world. User devices execute many different functions. User devices may also facilitate execution of many different functions remotely, such as via a connection to a server. One example function that may be performed by the user device 100 or remotely is recognition of handwritten text that is input to the user device 100.

A user can input handwriting to the user device 100 for recognition using one or more fingers, such as the finger 112. The user 108 may additionally or alternatively provide handwritten input to the user device 100 for recognition via the touch display 104 using a stylus, a mouse, a trackball, a pen, or the like.

Handwritten input generally includes one or more strokes, e.g., single points or continuous lines, which individually or collectively represent one or more characters in a writing system. A "stroke" can form a portion of a character, one or more full characters, a word or a portion of a word, a multi-word phrase, or even a complete sentence. A recognition engine parses handwritten input into individual handwritten characters. The recognition engine determines text characters based on the handwritten characters, respectively. The determined text characters are displayed to the user. It should be appreciated that while the description herein is directed to the recognition of a single character at a time, the present disclosure is equally applicable to the recognition of less than (a portion of) a single character or a plurality of single characters at a time. Thus, when the description herein discusses the recognition of handwritten input to determine a "character" it should be understood that the term "character" is intended to include a single character, multiple characters (including a word, multiple words, phrases, sentences, etc.) and a portion of a single character.

The handwritten input recognition can be performed locally (at the user device 100), in the cloud (at a server connected to the user device 100 via a network), or at a combination thereof. It should be appreciated that the techniques described herein as being performed at "a server" can be performed at more than one server in a distributed or parallel server arrangement. Thus, the term server as used herein is meant to include a single server and a plurality of servers working in conjunction.

The user device 100 generates two display portions on the touch display 104: a text display portion and a handwriting display portion. In the handwriting display portion, the user device 100 displays a handwritten input that is currently being recognized and any additional handwritten inputs that have not yet been recognized. In the text display portion, the user device 100 displays text corresponding to handwritten words and/or handwritten characters that have previously been recognized.

More so than just being aware that recognition of handwritten input is being performed, the user 108 may be interested in the progress of the recognition process. Accordingly, the user device 100 generates one or more visual indicators of the progress of the recognition of handwritten input. One or more techniques may be employed to inform the user 108 of the progress of the recognition of handwritten input.

One example technique includes displaying a progress bar with or without percentages to indicate the progress of the recognition. Another example technique includes displaying the characters determined for the handwritten characters of a handwritten input one-by-one as the handwritten characters are recognized. Yet another example technique includes displaying the handwritten characters of a handwritten input that have already been recognized in one color while displaying the handwritten characters of the handwritten input that have not yet been recognized in a different color.

While a handwritten input is being recognized, possible stems of a handwritten word represented by the handwritten input and possible whole words for one or more possible stems can be identified. The user device 100 may display the possible stems to the user 108. The user device 100 may display a possible word indicator with a possible stem when one or more possible whole words have been identified for the possible stem.

The user can select a possible stem that is displayed with a possible word indicator. When a possible stem is selected, the user device 100 displays possible words identified for the possible stem. The user 108 can select one of the possible words or one of the possible stems before the recognition of the handwritten input is complete. This may allow for faster recognition of handwritten input.

If the user begins inputting another handwritten input while a handwritten input is being recognized, the user device 100 may alter the size of the first handwritten input that is currently being recognized and the handwritten input(s) have not yet been recognized. The user device 100 may also display a recognition pending indicator for the user 108 when a handwritten input is currently being recognized and/or there are one or more additional handwritten inputs to be recognized.

Figure 2:
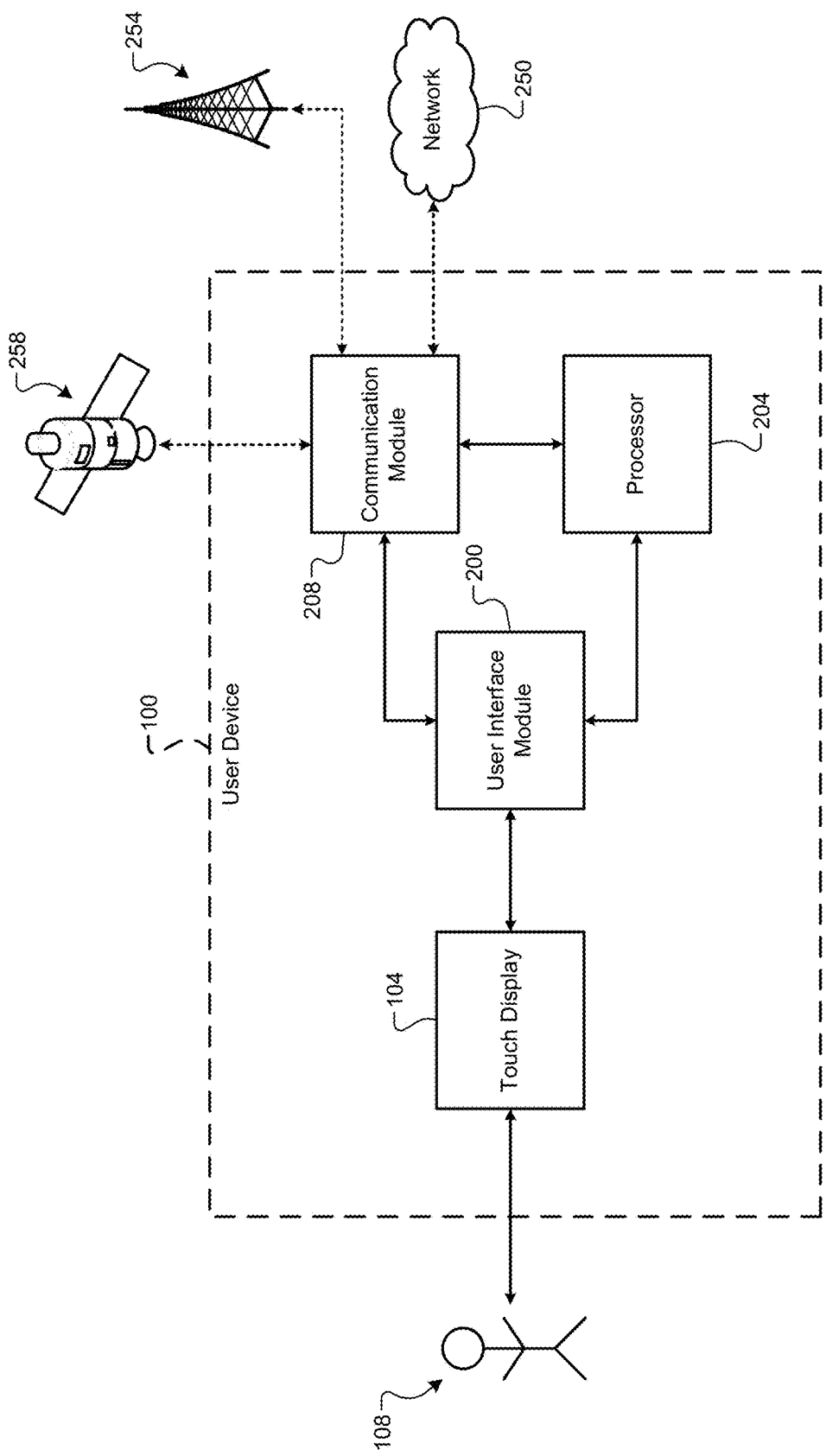
FIG. 2 is a functional block diagram of the example user device of FIG. 1.

Referring now to FIG. 2, an example of the user device 100 is shown in more detail. As previously described, the user device 100 includes the touch display 104. The touch display 104 may include any touch-sensitive display device, such as a capacitive sensing display. The touch display 104 displays information to the user 108 and receives information input by the user 108. As previously described, the user device 100 may additionally or alternatively include a physical character layout, e.g., a partial QWERTY-based keyboard, for receiving input from the user 108. In various implementations, the physical character layout may be rendered on a portion of the touch display 104 as a "soft keyboard."

The user device 100 may further include a user interface module 200, a processor 204, and a communication module 208. It should be appreciated that the user device 100 may include additional computing components such as memory and a power supply and that the functionality of the user interface module 200 and the communication module 208 may be executed in whole or in part by the processor 204. Thus, the terms user interface module 200 and communication module 208 as used herein may include one or more processors, such as the processor 204, executing instructions that cause the user device 100 to perform the described techniques.

The user interface module 200 can control communication with the user 108 via the touch display 104 of the user device 100. The user interface module 200 may provide the user 108 with various different input configurations via the touch display 104 of the user device 100. For example, the user interface module 200 may provide the user 108 with a form of the standard QWERTY keyboard via the touch display 104 of the user device 100. Additionally or alternatively, the user interface module 200 may provide the user 108 with an interface for inputting handwritten input for recognition.

The recognition of handwritten input may be performed locally at the user device 100, at a remote server (in the "cloud"), or a combination thereof. The user interface module 200 displays text recognized for the handwritten input via the touch display 104. The user interface module 200 also displays one or more visual indicators of the progress of the recognition of handwritten input on the touch display 104.

The processor 204 controls most operations of the user device 100 and may communicate with both the user interface module 200 and the communication module 208. For example, the processor 204 may perform tasks such as, but not limited to, loading/controlling the operating system of the user device 100, loading/executing programs and functions, loading/configuring communication parameters for the communication module 208, controlling handwriting recognition parameters, and controlling memory storage/retrieval operations. It should be appreciated that while a single processor 204 is illustrated, a plurality of individual processors operating in a parallel or distributed configuration can be utilized instead of a single processor. Thus, the term processor (such as processor 204) used herein is meant to include one or more processors operating to perform the techniques described.

The communication module 208 controls communication between the user device 100 and other devices. For example only, the communication module 208 may provide for communication between the user device 100 and other users associated with the user 108 and/or the Internet. The user device 100 may communicate via a computing network 250, such as the Internet (hereinafter "the network 250"), a mobile telephone (cellular) network 254, a satellite network 258, and/or any other suitable communication medium. The communication module 208 may be configured for both wired and wireless network connections, radio frequency (RF) communication, and the like.

Figure 3:
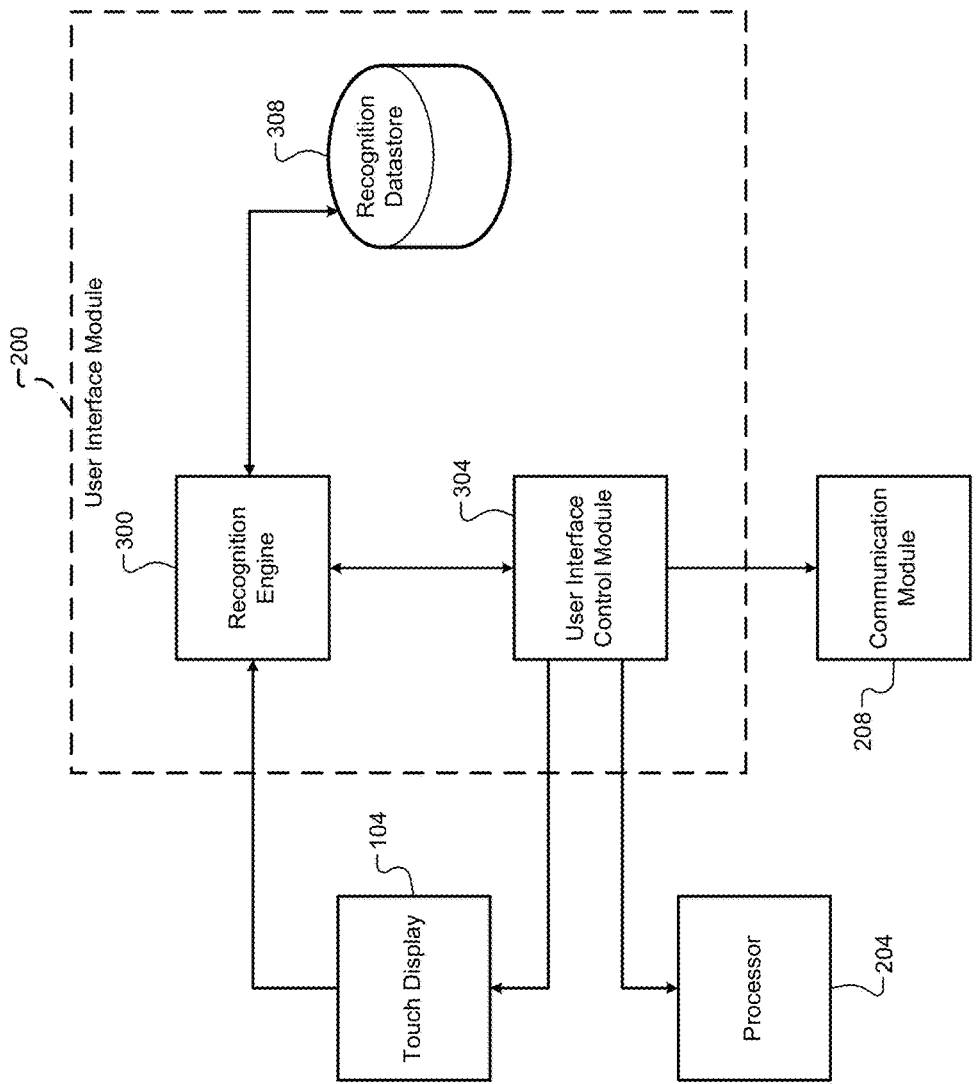
FIG. 3 is a functional block diagram of an example of a user interface module of the user device of FIG. 1.

Referring now to FIG. 3, a functional block diagram of an example of the user interface module 200 is shown. The user interface module 200 may include a recognition engine 300, a user interface control module 304, and a recognition datastore 308. While these three modules and a single datastore are shown and described herein, the user interface module 200 may include additional computing components such as other memory and the like.

The user interface control module 312 displays a handwriting recognition interface on the touch display 104 for the user 108 to input handwriting to the user device 100 for recognition. The user interface control module 312 also operates such that text recognized based on the handwritten input is displayed to the user 108.

Figure 4:
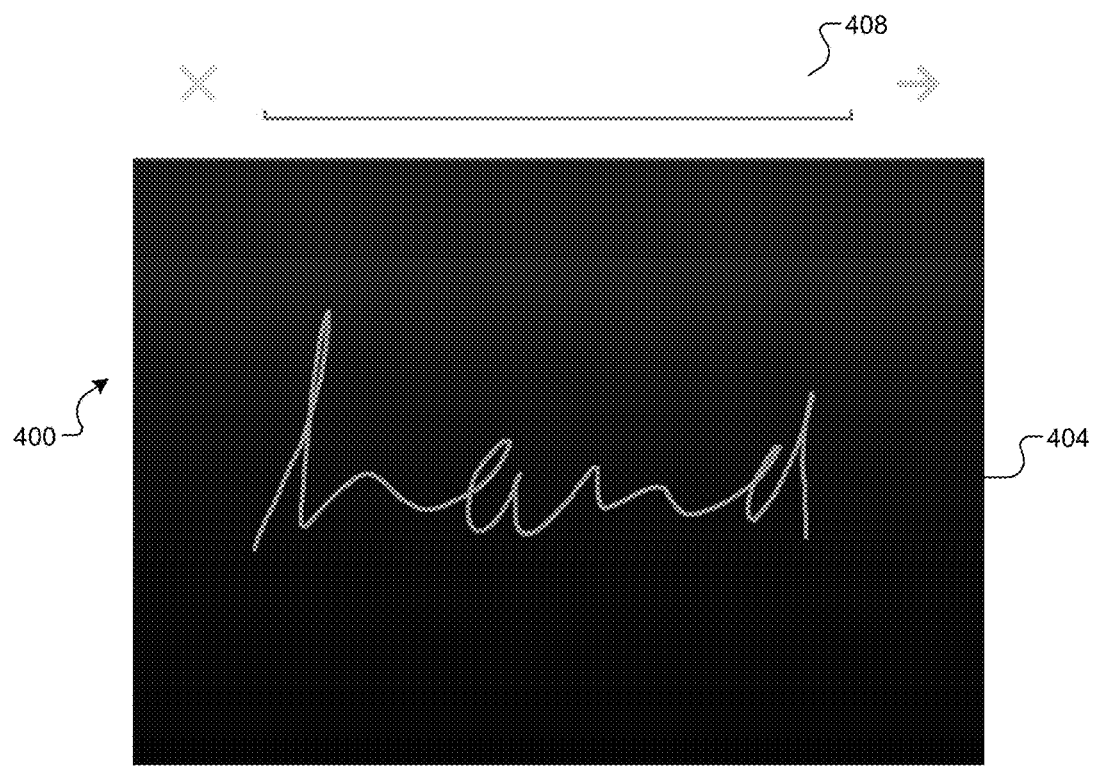
FIGS. 4-8 are example illustrations of a user display at various times during recognition of handwritten text according to some implementations of the present disclosure.

An example of a handwriting recognition interface 400 displayed on the touch display 104 is presented in FIG. 4. Referring now to FIGS. 3 and 4, the handwriting recognition interface 400 may include two portions: a handwriting display portion 404 and a text display portion 408. The handwriting recognition interface 400 may also include a whole or partial keyboard, such as a QWERTY based keyboard, a T9 based keyboard, or another suitable type of interface from which the user 108 can input spaces, returns, punctuation marks, symbols, and the like. In the example of FIG. 4, the handwriting recognition interface 400 is displayed on the touch display 104 without an interface from which the user 108 can input spaces, returns, punctuation marks, symbols, and the like.

The user 108 may input handwriting for recognition anywhere upon the touch display 104 or within a smaller portion of the touch display 104, such as within the handwriting display portion 400. The user interface module 200 may display the handwriting input as it is input by the user 108 in real time, during recognition of handwriting, or both. It should be understood that real time may include an acceptable amount of delay between input and display.

Once the user 108 provides a handwritten input, the user interface module 200 may display the handwritten input within the handwriting display portion 404 of the handwriting recognition interface 400. A handwritten input "hand" is displayed within the handwriting display portion 404 in the example of FIG. 4. The user 108 can provide handwritten input using cursive or print (also referred to as block letter). While handwriting in the English language is discussed and shown, the recognition and display techniques disclosed herein are also applicable to handwritten input in other languages.

Text recognized for handwritten input is displayed to the user 108 in the text display portion 408 of the handwriting recognition interface 400. As no part of the handwritten input has yet been recognized in the example of FIG. 4, no text is displayed in the text display portion 408.

The recognition engine 300 may parse the handwritten input into various portions, such as one or more handwritten characters. For example, the recognition engine 300 can parse the handwritten input "hand" into four handwritten characters that form the handwritten input. In various languages, a character may correspond to a word.

Figure 5:
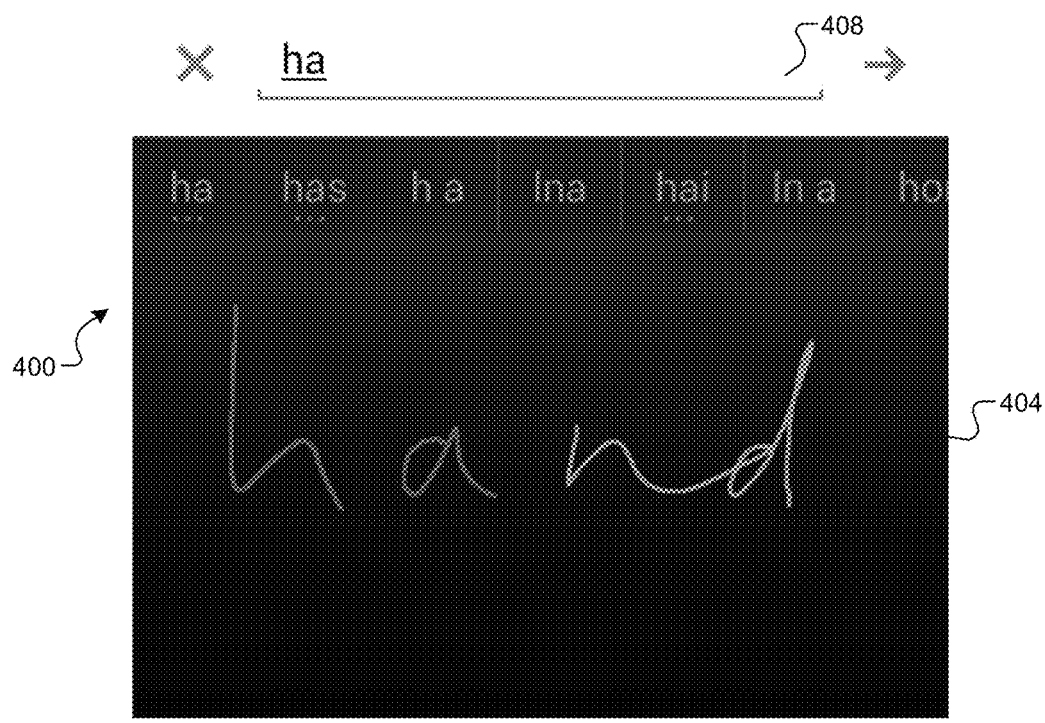

The recognition engine 300 may parse handwritten input into handwritten characters using data stored in the recognition datastore 308. The user interface control module 304 may update what is displayed to display a representation of the handwritten input using the one or more handwritten characters. FIG. 5 includes an example representation of the handwritten input "hand" displayed in the handwriting display portion 404 using the four handwritten characters.

Based on data stored in the recognition datastore 308, the recognition engine 300 can recognize the handwritten characters of the handwritten input one by one. In other words, the recognition engine 300 may determine text characters for the handwritten characters one handwritten character at a time. In some implementations, the recognition engine 300 may recognize multiple handwritten characters of a handwritten input at a time. The order that the recognition engine 300 recognizes the handwritten characters may be a logical order of reading, such as left to right for recognition of English language.

The user interface control module 304 generates a visual indicator of the progress of the recognition of the handwritten characters on the touch display 104. The visual indicator may include a combination of one or more features that visually display the progress of the recognition to the user 108 via the touch display 104.

For example, the user interface control module 304 may display a progress bar on the touch display 104 and update the progress bar as the handwritten characters are determined. The progress bar may or may not include a numerical percentage indicative of the percentage of the recognition that is complete.

In another example, the user interface control module 304 displays the text characters within the text display portion 408 as they are determined. FIG. 5 is an example of the text characters "h" and "a" determined from the first two handwritten characters of the handwritten input "hand" being displayed. The addition of the text characters as the text characters are determined provides a visual indication of the progress of the recognition to the user 108.

In yet another example, the user interface control module 304 changes the color of at least a portion of the handwritten input as the handwritten characters are recognized. In this manner, the handwritten characters for which text characters have been determined are displayed in a first color and the handwritten characters for which text characters have not yet been determined are displayed in a second color that is different than the first color. FIG. 5 also illustrates the first two of the four handwritten characters being displayed in a first color while the last two of the four handwritten characters are displayed in a second color that is different than the first color.

Figure 6:
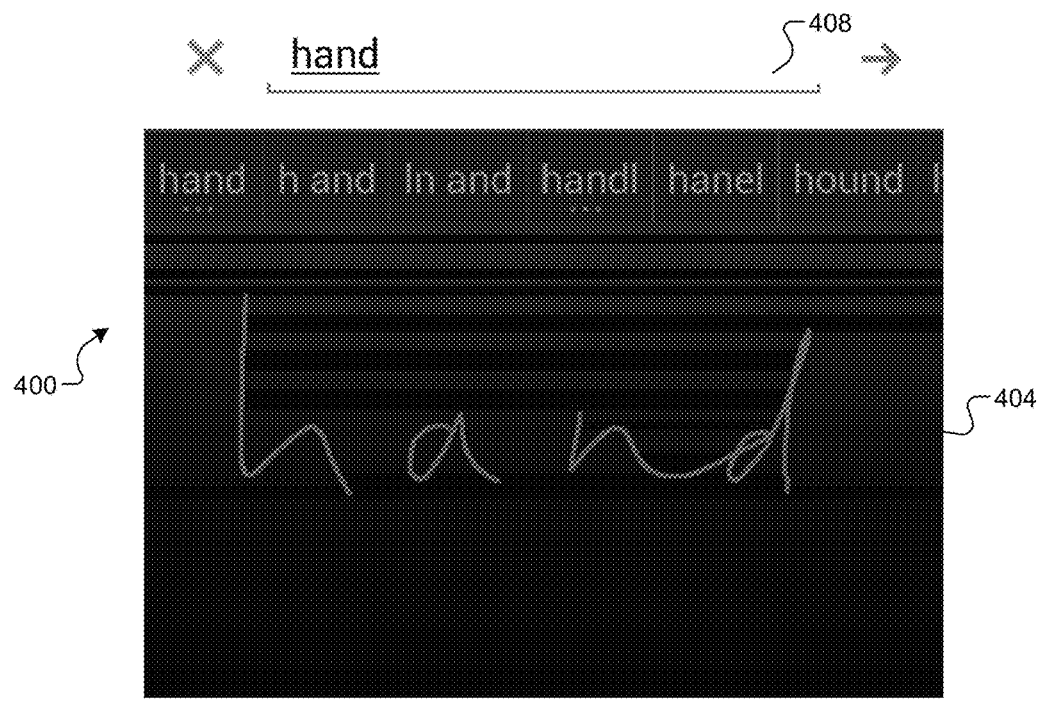

FIG. 6 illustrates the text characters "h," "a," "n," and "d" being displayed after being determined based on the four handwritten characters, respectively. FIG. 6 also illustrates all four of the handwritten characters of the handwritten input "hand" being displayed in the second color because the text characters for the four handwritten characters have been determined. After all of the handwritten characters of the handwritten input have been recognized and the determined text characters are being displayed, the user interface control module 304 may remove the handwritten input from being displayed.

As a handwritten input is being recognized, the recognition engine 300 may identify possible stems of the handwritten input. The recognition engine 300 ay also identify possible stems of the handwritten input after the handwritten input has been recognized. The recognition engine 300 may determine the possible stems based on the text characters determined for the handwritten input. A stem may refer to part of a word, a phrase, and/or a sentence. A stem may also refer to a whole word to which affixes (e.g., suffixes) can be attached.

For example, once the characters "h" and "a" have been recognized from the first two handwritten characters of the handwritten input "hand" in FIG. 5, the recognition engine 300 may determine that the possible stems include "ha", "hat", "Ina", "Ira", etc. The user interface control module 304 selectively displays the possible stems on the touch display 104. The user interface control module 304 may display other possible stems in response to the user 108 touching the touch display 104 in the area of the touch display 104 where the possible stems are displayed.

The recognition engine 300 may display a possible word indicator with a possible stem when one or more possible whole words have been identified for the possible stem. For example, possible word indicator " . . . " is displayed with possible stems for which one or more possible whole words have been identified in the examples of FIGS. 5 and 6. For example only, the possible stem "ha" is displayed with the possible word indicator " . . . " in the example of FIG. 5 because one or more whole words, such as "hands," have been identified for the possible stem "ha."

Figure 7:
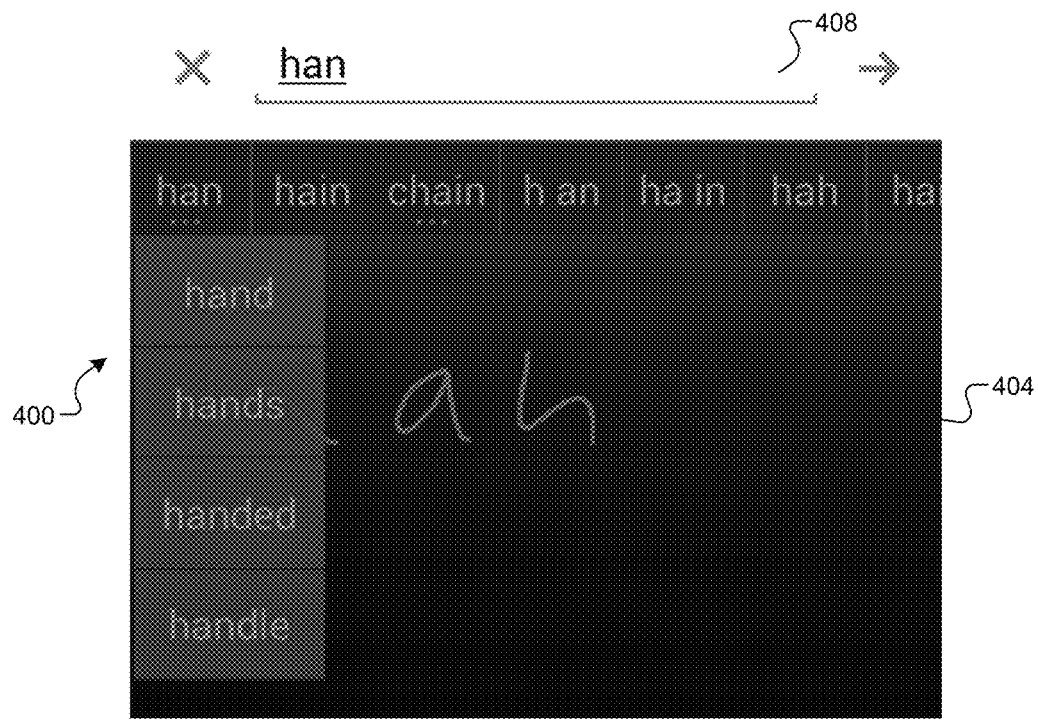

The user 108 can select a possible stem that is displayed with a possible word indicator. The user 108 can select a possible stem, for example, by touching the touch display 104 in or near an area defined around the possible stem. When a possible stem is selected, the user interface control module 304 displays possible whole words identified for the selected possible stem. For example, the user interface control module 304 may display the possible whole words "hand," "hands," "handed," and "handle" in response to the user 108 selecting the possible stem "han" as illustrated in the example of FIG. 7. The user interface control module 304 may display the possible whole words in a pop-up or drop-down menu or in another suitable manner.

The user 108 can select one of the possible whole words before the recognition of the handwritten word is complete. This may enable faster recognition of handwritten input. Additionally, as one or more possible whole words may be identified even after the entire handwritten word has been recognized, short hand handwriting may be used. For example, in the example of FIG. 6, the handwritten input "hand" has been recognized and is displayed in the text display portion. However, "hand" has also been identified as a possible stem, and one or more possible whole words have been identified for the possible stem "hand." Examples of possible whole words that may be identified based on the possible stem "hand" include, for example, "hands," "handed," "handle."

Figure 8:

If the user 108 begins providing another handwritten input before a first handwritten input has been recognized, the user interface control module 304 may shrink the first handwritten input. FIG. 8 includes an example of a smaller version of the handwritten input "hand."

The user interface control module 304 may also display a recognition pending indicator within the text display portion of the display when the first handwritten input is being recognized and/or there are one or more additional handwritten inputs to be recognized. For example, the user interface control module 304 may display " . . . " as a recognition pending indicator as shown in FIGS. 5-7 or another suitable indicator that recognition of one or more handwritten inputs is pending.

Figure 9:
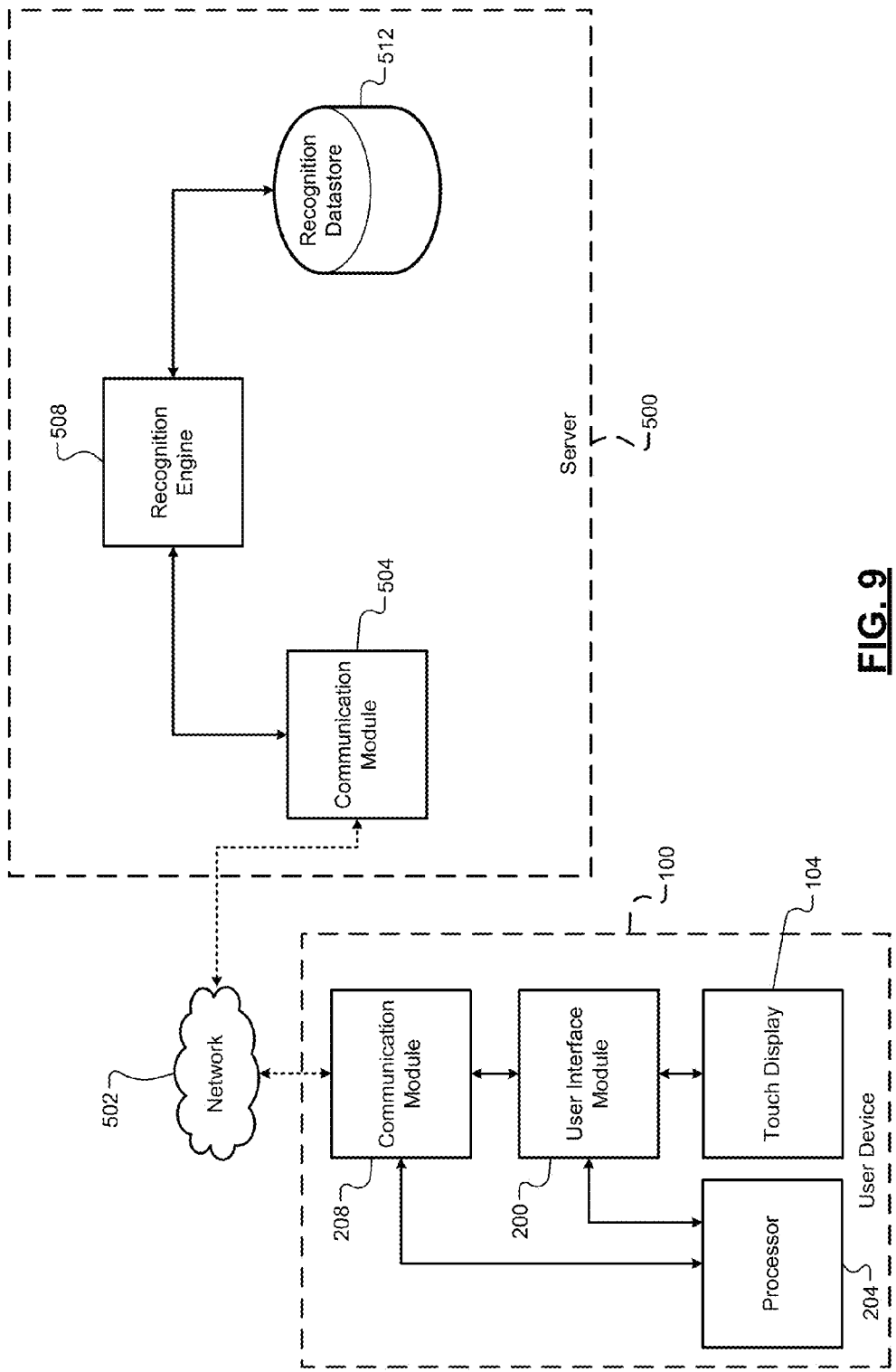
FIG. 9 is a functional block diagram of the example user device of FIG. 1 and an example server according to some implementations of the present disclosure.

Referring now to FIG. 9, a functional block diagram of another example handwriting recognition system is presented. As stated above, the recognition of handwriting input may be performed wholly or in part by a remote server 500. The user interface module 200 may capture a digital representation of a handwritten input that is input to the touch display 104. The communication module 208 may transmit the digital representation to the server 500 via a network 502. The network 502 may be, for example, the network 250, the cellular network 254, the satellite network 258, or another suitable type of network. The server 500 may include a communication module 504, an input determination module 508, a recognition datastore 512, and a recognition engine 516. It should be appreciated that the server 500 may include additional computing components such as one or more processors, memory, a power supply, and other suitable computing components.

The server 500 may receive the digital representation via the communication module 504. The recognition engine 508 may parse the digital representation into handwritten characters. The recognition engine 508 may parse the handwritten input into handwritten characters, for example, using data stored in the recognition datastore 512. The server 500 may transmit one or more representations of the handwritten characters back to the user device 100 for the user device 100 to display the handwritten characters to the user 108.

The recognition engine 508 may determine the text characters for the handwritten characters one by one or more than one at a time. For example, the recognition engine 508 may determine the text characters for the handwritten characters using data stored in the recognition datastore 512. The server 500 can transmit indicators of the text characters for the handwritten characters to the user device 100 as the text characters are determined. The user device 100 determines the text characters based on the indicators and displays the text characters to the user 108 via the touch display 104.

The user device 100 also displays one or more visual indicators of the progress of the recognition of the handwritten input via the touch display 104, such as one or more of the visual indicators described above. The user device 100 may determine the possible stems and the possible whole words based on the text characters. For example, the user device 100 may determine the possible stems and the possible whole words using a dictionary datastore (not shown) implemented in memory of the user device 100.

Figure 10:
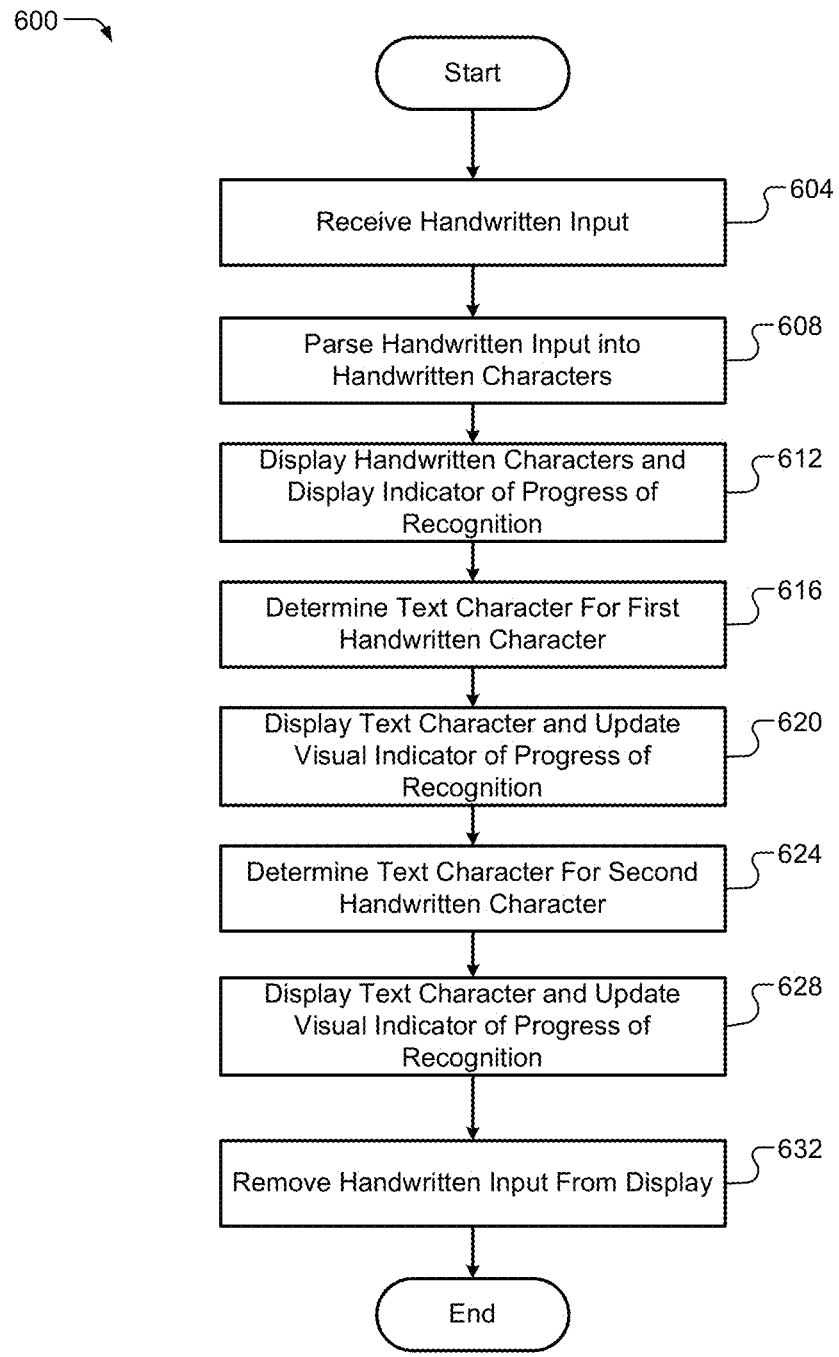
FIG. 10 is a flowchart depicting an example technique of performing handwriting recognition at a user device according to some implementations of the present disclosure.

Referring now to FIG. 10, an example technique 600 of recognizing a handwritten input and displaying progress of the handwritten input at the user device 100 is presented. The technique 600 may begin with 604 where the user device 100 receives a handwritten input from the user 108 via the touch display 104. At 608, the user device 100 parses the handwritten input into one or more handwritten characters. The user device 100 may display the handwritten characters that form the handwritten input on the touch display 104 at 612. The user device 100 may also display one or more visual indicators of progress of recognition of the handwritten input at 612.

The user device 100 determines the text character for a first one of the one or more handwritten characters at 616. The user device 100 may determine the text character, for example, based on the first one of the handwritten characters and data for determining a text character based on a handwritten character. At 620, the user device 100 displays the text character determined for the first one of the handwritten characters and updates the one or more visual indicators displayed to indicate the progress of the recognition of the handwritten input to the user 108.

At 624, the user device 100 determines the text character for a second one of the one or more handwritten characters. The user device 100 may determine the text character, for example, based on the second one of the handwritten characters and the data for determining a text character based on a handwritten character. At 628, the user device 100 displays the text character determined for the second one of the handwritten characters and updates the one or more visual indicators displayed to indicate the progress of the recognition of the handwritten input to the user 108. The user device 100 may continue to determine the text characters for the remaining handwritten characters, if any, display the determined text characters, and update the one or more visual indicators displayed. At 632, once all of the handwritten characters have been recognized and the determined text characters displayed, the user device 100 may remove the handwritten characters from the touch display 104.

Figure 11:
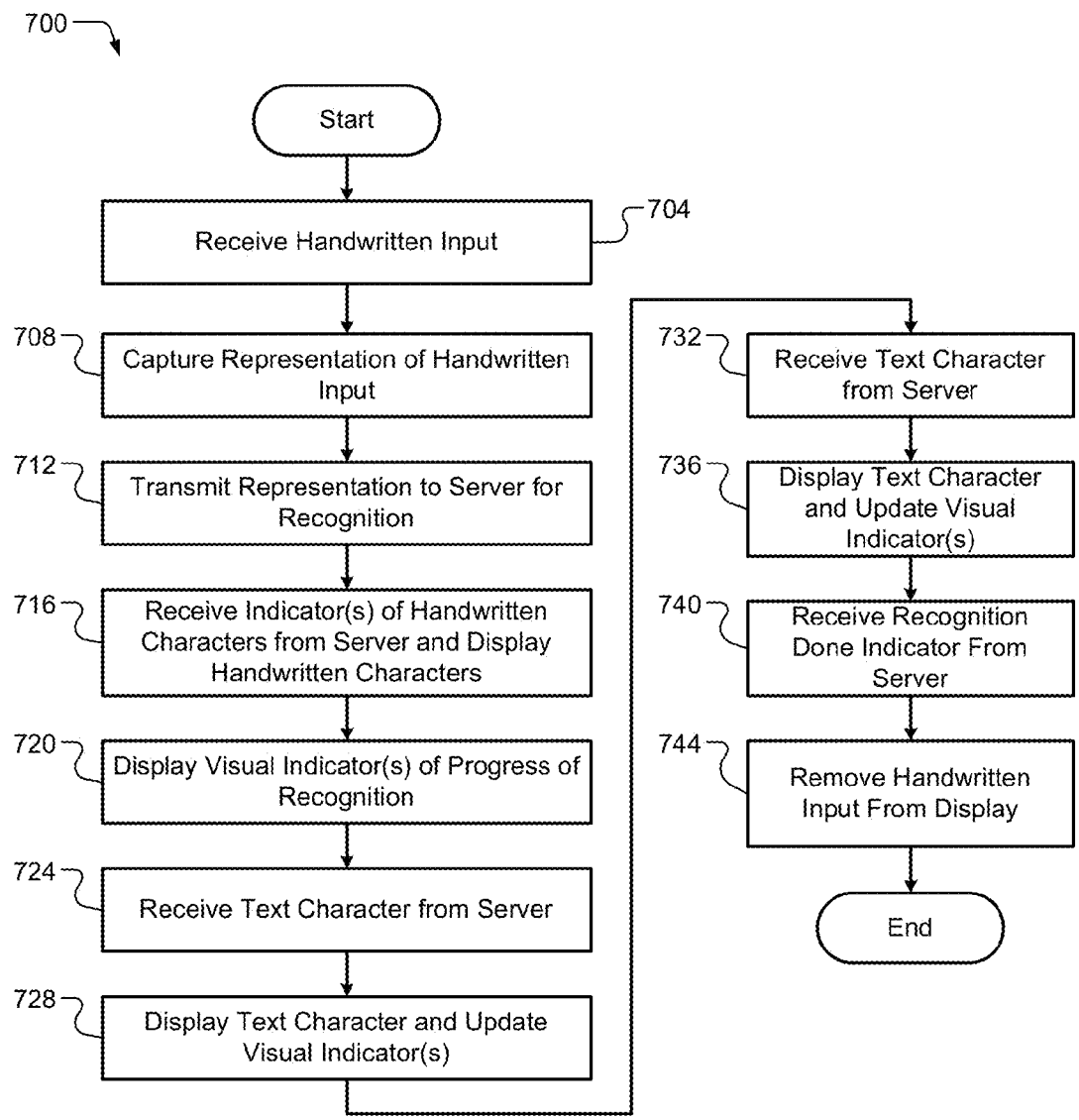
FIG. 11 is a flowchart depicting an example technique that may be performed by a user device for performing handwriting recognition according to some implementations of the present disclosure.

Referring now to FIG. 11, an example technique 700 that may be performed by the user device 100 where recognition of handwritten input is performed at the server 500 is presented. The technique may begin with 704 where the user device 100 receives handwritten input from the user 108 via the touch display 104. At 708, the user device 100 may capture a representation of the handwritten input. The user device 100 transmits the representation of the handwritten input to the server 500 for recognition of the handwritten input at 712. At 716, the user device 100 receives one or more indicators of the handwritten characters of the handwritten input as parsed by the server 500. The user device 100 may also display the handwritten characters via the touch display 104.

The user device 100 displays one or more visual indicators of the progress of the recognition of the handwritten input at 720. The user device 100 receives a text character corresponding to the first handwritten character of the handwritten input at 724. The user device 100 displays the text character corresponding to the first handwritten character and updates the one or more visual indicators of the progress of the recognition at 728.

At 732, the user device 100 receives a text character corresponding to the second handwritten character of the handwritten input. The user device 100 displays the text character corresponding to the second handwritten character and updates the one or more visual indicators of the progress of the recognition at 736. The user device 100 may continue to receive the text characters corresponding to the remaining handwritten characters, if any, from the server 500, display the determined text characters, and update the one or more visual indicators displayed as they are received. At 740, once all of the handwritten characters have been recognized, the user device 100 may receive an indicator from the server 500 that the recognition of the handwritten input is complete. The user device 100 may remove the handwritten characters from the touch display 104 at 744.

Figure 12:
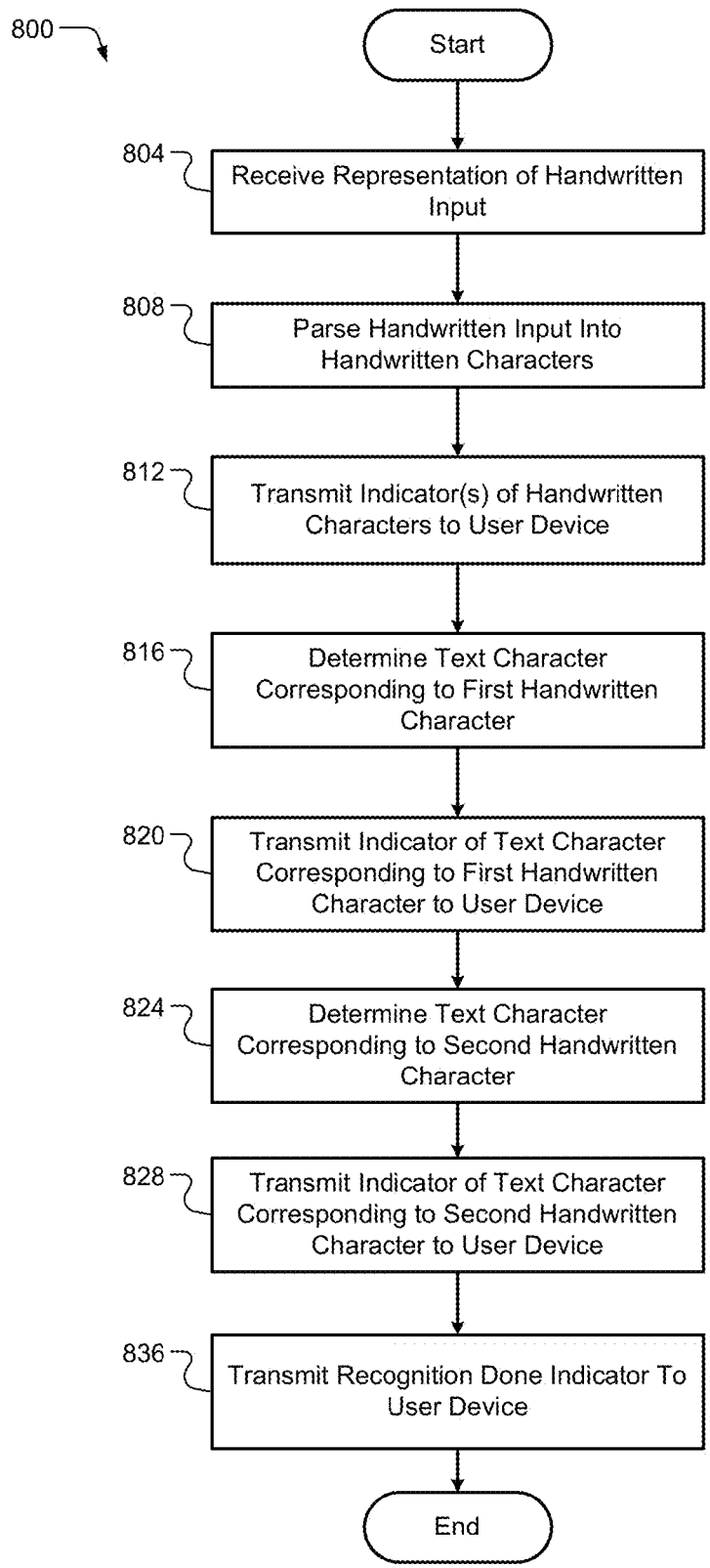
FIG. 12 is a flowchart depicting an example technique of performing handwriting recognition according to some implementations of the present disclosure.

Referring now to FIG. 12, an example technique 800 that may be performed by the server 500 is presented. The technique may begin with 804 where the server 500 receives a representation of a handwritten input from a user device, such as the user device 100. The server 500 parses the representation into one or more handwritten characters at 808. The server 500 may transmit one or more indicators of the handwritten characters to the user device at 812.

At 816, the server 500 determines a text character corresponding to the first one of the one or more handwritten characters. The server 500 transmits an indicator of the text character corresponding to the first one of the handwritten characters at 820. At 824, the server 500 may determine a text character corresponding to the second one of the one or more handwritten characters. The server 500 transmits an indicator of the text character corresponding to the second one of the handwritten characters at 828. The server 500 may continue to determine the text characters corresponding to the remaining handwritten characters, if any, and transmit indicators of the text characters as they are determined. Once a text character has been determined for each of the handwritten characters, the server 500 may transmit the recognition done indicator to the user device at 836.

Example embodiments are provided so that this disclosure will be thorough, and will fully convey the scope to those who are skilled in the art. Numerous specific details are set forth such as examples of specific components, devices, and techniques, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The technique steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code, or a process executed by a distributed network of processors and storage in networked clusters or datacenters; other suitable components that provide the described functionality; or a combination of some or all of the above, such as in a system-on-chip. The term module may include memory (shared, dedicated, or group) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required technique steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method comprising:
receiving, at a user device, user input corresponding to handwritten text to be recognized;
transmitting, from the user device, a representation of the handwritten text to a server for recognition of the handwritten text;
receiving, at the user device and from the server, data parsing the handwritten text into handwritten characters, the handwritten characters determined by the server based on the representation of the handwritten text;
displaying, in a first portion of a display of the user device, the handwritten characters using a first color;
receiving data identifying text characters at different times from the server, wherein each text character corresponds to a respective handwritten character recognized by the server;
displaying, in a second portion of the display of the user device, the data identifying the text characters as the data are received; and
changing, in the first portion of the display of the user device, the handwritten characters from the first color to a second color in response to receipt of the data identifying the text characters recognized as the handwritten characters, wherein the first and second colors are different.

2. A computer-implemented method comprising:
receiving, at a user device, user input corresponding to handwritten text to be recognized using a recognition engine;
receiving, at the user device, a representation of the handwritten text, the representation including the handwritten text parsed into individual handwritten characters;
displaying, in a first portion of a display of the user device, the handwritten characters using a first indicator;
receiving, at the user device, an identification of a text character recognized as one of the handwritten characters by the recognition engine;
displaying, in a second portion of the display of the user device, the text character; and
adjusting, at the user device, the one of the handwritten characters from being displayed using the first indicator to being displayed using a second indicator in response to the received identification of the text character recognized as the one of the handwritten characters by the recognition engine, wherein the first and second indicators are different, while continuing to display handwritten characters that have not yet been recognized by the recognition engine using the first indicator.

3. The method of claim 2, wherein the first indicator is a first color and the second indicator is a second color.

4. The method of claim 2, further comprising:
receiving, at the user device, a second identification of a second text character recognized as a second one of the handwritten characters by the recognition engine; and
adjusting, at the user device, the second one of the handwritten characters from being displayed using the first indicator to being displayed using the second indicator in response to the received second identification.

5. The method of claim 4, further comprising:
determining, at the user device, a possible stem for the handwritten text based on the text character and the second text character; and
displaying, in the second portion of the display of the user device, the possible stem.

6. The method of claim 5, further comprising:
receiving, at the user device, user input indicating a selection of the possible stem;
determining, at the user device, a possible word for the handwritten text based on the possible stem; and
displaying, in the second portion of the display of the user device, the possible word in response to the receipt of the user input indicating the selection of the possible stem.

7. The method of claim 2, further comprising displaying, on the display, a progress bar indicative of an amount of the handwritten text that has been recognized by the recognition engine.

8. The method of claim 7, further comprising displaying, on the display, a percentage corresponding to the amount.

9. The method of claim 2, wherein the display is a touch display and the user input is received via the touch display.

10. The method of claim 2, further comprising:
receiving, at the user device, a second user input corresponding to additional handwritten text to be recognized using the recognition engine; and
changing a size of the displayed handwritten characters in response to the second user input.

11. A computing device, comprising:
a display;
at least one processor coupled to the display; and
a non-transitory computer-readable storage medium storing executable computer program code, the at least one processor configured to execute the executable computer program code to perform operations including:
receiving user input corresponding to handwritten text to be recognized using a recognition engine;
receiving a representation of the handwritten text, the representation including the handwritten text parsed into individual handwritten characters;
displaying, in a first portion of a display of a user device, the handwritten characters using a first indicator;
receiving an identification of a text character recognized as one of the handwritten characters by the recognition engine;
displaying, in a second portion of the display of the user device, the text character; and
adjusting the one of the handwritten characters from being displayed using the first indicator to being displayed using a second indicator in response to the received identification of the text character recognized as the one of the handwritten characters by the recognition engine, wherein the first indicator is a first color and the second indicator is a second color and the first and second indicators are different,
while continuing to display handwritten characters that have not yet been recognized by the recognition engine using the first indicator.

12. The computing device of claim 11, wherein the operations further include:
receiving a second identification of a second text character recognized as a second one of the handwritten characters by the recognition engine; and
adjusting the second one of the handwritten characters from being displayed using the first indicator to being displayed using the second indicator in response to the received second identification.

13. The computing device of claim 11, wherein the operations further include:
determining a possible stem for the handwritten text based on the text character and a second text character; and
displaying, in the second portion of the display of the user device, the possible stem.

14. The computing device of claim 13, wherein the operations further include:
receiving user input indicating a selection of the possible stem;
determining a possible word for the handwritten text based on the possible stem; and
displaying, in the second portion of the display of the user device, the possible word in response to the receipt of the user input indicating the selection of the possible stem.

15. The computing device of claim 11, wherein the operations further include displaying, on the display, a progress bar indicative of an amount of the handwritten text that has been recognized by the recognition engine.

16. The computing device of claim 15, wherein the operations further include displaying, on the display, a percentage corresponding to the amount.

17. The computing device of claim 11, wherein the operations further include removing at least one of the handwritten characters from the first portion of the display of the user device only after text characters recognized for the handwritten characters are all displayed.

18. The computing device of claim 11, wherein the operations further include:
receiving, at the user device, a second user input corresponding to additional handwritten text to be recognized using the recognition engine; and
changing a size of the displayed handwritten characters in response to the second user input.

19. The method of claim 2, wherein:
receiving the representation of the handwritten text comprises generating, at the user device, the representation of the handwritten text; or
receiving the identification of the text character recognized as one of the handwritten characters comprises generating, at the user device, the identification.

20. The computing device of claim 11, wherein
receiving the representation of the handwritten text comprises generating, at the user device, the representation of the handwritten text; or
receiving the identification of the text character recognized as one of the handwritten characters comprises generating, at the user device, the identification.

21. The computer-implemented method of claim 1, further comprising:

removing, from the first portion of the display of the user device, the handwritten characters only after the text characters are all displayed in the second portion of the display of the user device.

22. The computer-implemented method of claim 2, further comprising:

removing at least one of the handwritten characters from the display only after the text characters recognized for the handwritten characters are all displayed.

* * * * *